US006152505A

United States Patent [19]
Coyne

[11] Patent Number: 6,152,505
[45] Date of Patent: Nov. 28, 2000

[54] GLAZING TONGS

[76] Inventor: Kenneth Gerod Coyne, P.O. Box 992, Ketchum, Id. 83340

[21] Appl. No.: 09/369,751

[22] Filed: Aug. 6, 1999

[51] Int. Cl.[7] ...................................................... B65G 7/12
[52] U.S. Cl. ................................ 294/16; 294/28; 294/118
[58] Field of Search ................................. 294/11, 15, 16, 294/28, 31.1, 62, 104, 106, 117, 118, 902, 903; 118/500, 503

[56] References Cited

U.S. PATENT DOCUMENTS

| 665,549 | 1/1901 | Rankin | 294/118 |
|---|---|---|---|
| 1,365,196 | 1/1921 | Richardson | 294/16 X |
| 1,552,317 | 9/1925 | Lamb et al. | 294/28 |
| 1,630,013 | 5/1927 | Hyatt | 294/11 |
| 1,906,454 | 5/1933 | Elters | 294/28 X |
| 2,023,328 | 12/1935 | Lamp | 294/16 |
| 4,477,113 | 10/1984 | Lybolt | 294/16 |
| 5,871,244 | 2/1999 | Langford | 294/104 X |

*Primary Examiner*—Johnny D. Cherry

[57] ABSTRACT

A tongs provides a set of opposing feet with pointed toes so as to securely grip unfired ware such as ceramic or clay pots and the like. Two feet on one side move in opposition to a single foot on the opposing side of the device and are drawn together by the biasing spring. An upwardly directed, hook like handle is used to hold and manipulate the tongs and to hang the tongs and greenware during drying.

12 Claims, 2 Drawing Sheets

GLAZING TONGS

BACKGROUND OF THE INVENTION

1. Field of the Invention

This invention relates generally to manual hand tools, and more particularly to a specialty tongs for gripping pottery advantageously during its construction and especially during glazing operations.

2. Description Of Related Art

Hand tools of a very wide variety have been constructed and used since early times by artisans. Such tools are constructed for holding, lifting, manipulating, supporting and many other manual tasks. Tools that are of the same genus as the present invention are constructed for gripping, grasping, cutting, crushing, bending, puncturing and other tasks that advantageously provide opposing mandibles with surfaces that may be flat, curved or sharp, etc. Cutters, plyers, adjustable wrenches, dykes and other common hand tools are of this family of useful devices. Tongs are a particular type of hand tool with opposing surfaces which are drawn toward each other usually by closing the hand that holds the tool. Tongs are used for picking up and manipulating ice cubes, foods, small parts, hot materials, sterile bandages and many other applications. Such devices are generally of light construction and are not meant to apply a crushing or cutting force, but only to act as an extension of the human hand providing leverage, reach and an improved picking capacity relative to the human hand.

The prior art does not teach that a tongs may be constructed in a manner as to enable secure gripping of unfired ware as well as bisque during dipping operations. The present invention fulfills these needs and provides further related advantages as described in the following summary.

SUMMARY OF THE INVENTION

The present invention teaches certain benefits in construction and use which give rise to the objectives described below.

The present invention provides a tongs having a set of opposing feet with pointed toes so as to securely grip unfired ware such as ceramic or clay pots and the like. Two feet on one side move in opposition to a single foot on the opposing side of the device and are drawn together by the biasing spring. An upwardly directed, hook like handle is used to hold and manipulate the tongs and to hang the tongs and greenware during drying. The tongs are also able to rest like an inverted tripod in a slotted board to enable drying heavier ware in an attitude wherein the rim is facing upwardly.

A first primary objective of the present invention is to provide a tongs having advantages not taught by the prior art.

A second primary objective is to provide such a tongs which is enabled by its character and features to handle fragile bone-dry and leatherhard ware safely so as to avoid one full stage of the production process, namely, bisque firing.

Another objective is to provide a tongs having simple construction enabled for securely gripping a greenware ceramic pot.

A further objective is to provide a tongs having adjustment of the compressive force applied to the ceramic pot.

A still further objective is to provide a tongs capable of hanging a ceramic pot to dry while not disturbing the decorative surface of the pot appreciably.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
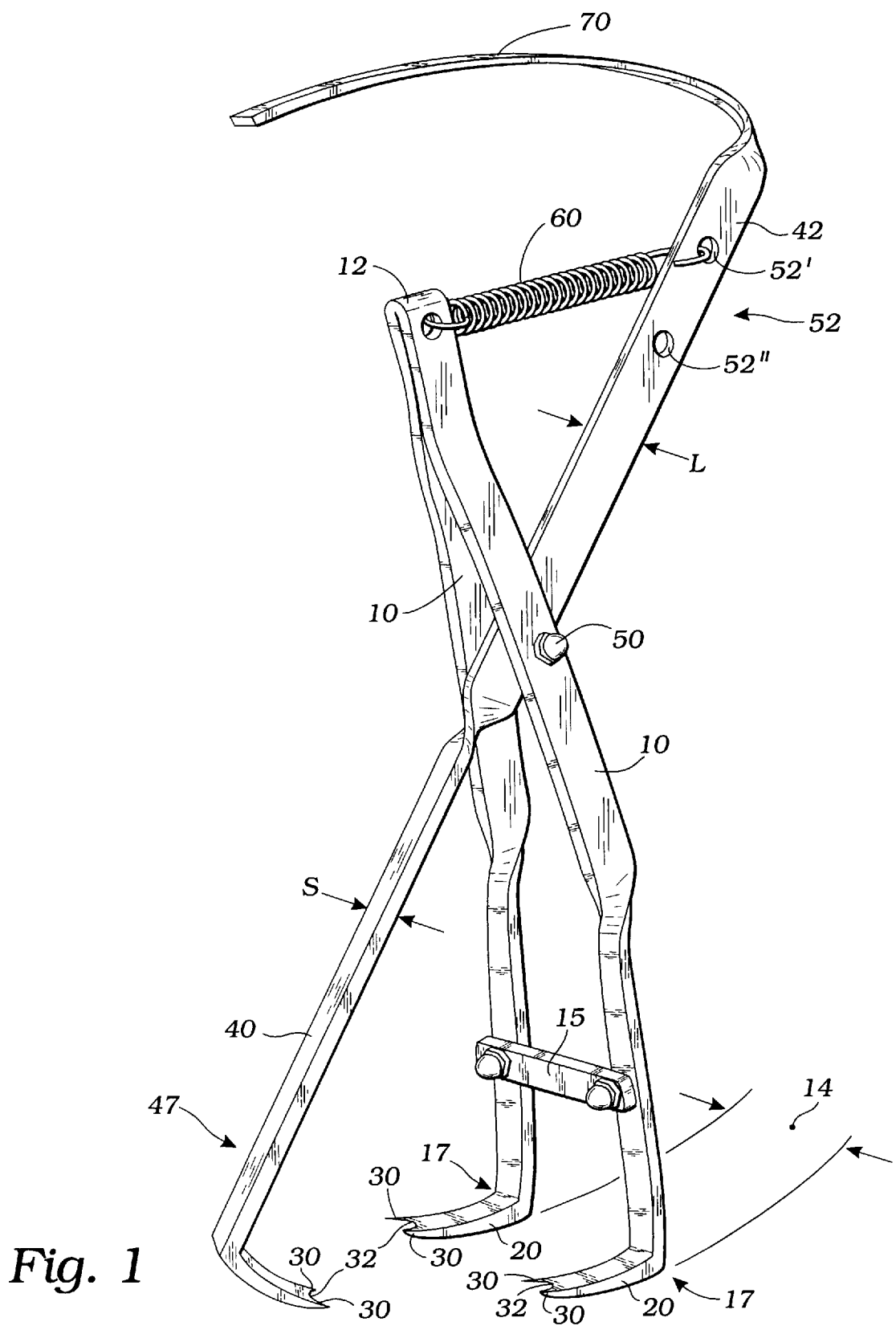
FIG. 1 is a perspective view of the preferred embodiment of the present invention.
Figure 2:
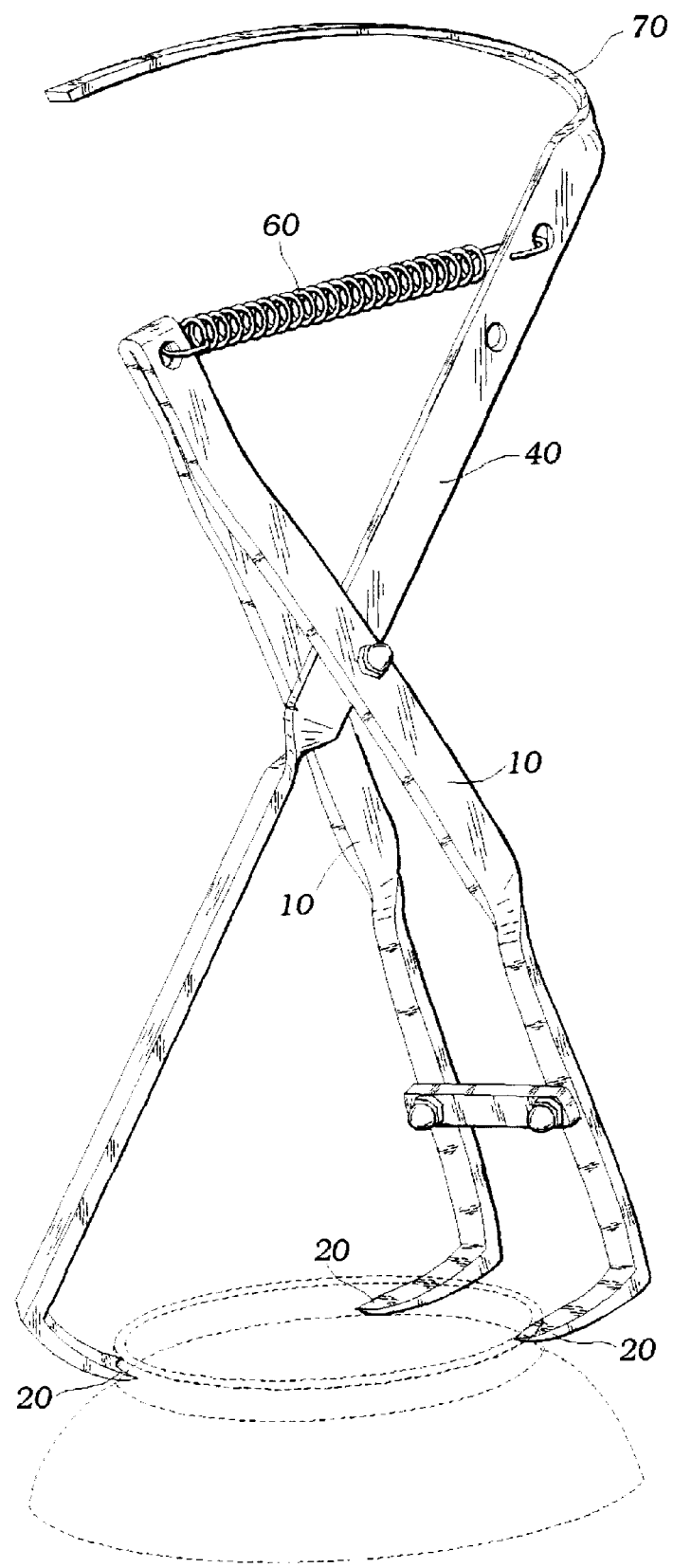
FIG. 2 is a further perspective view showing how the invention is able to grip and support a pot.

The above described drawing figures illustrate the invention, a tongs apparatus preferably made of steel or a material with comparable structural characteristics, comprising, as shown in FIGS. 1 and 2, a pair of first mutually divergent arms 10, each of the arms 10 distally terminating with a foot 20, formed at a right angle to the arms 10 and having a single pointed toe as shown in FIG. 2, or two or more spaced apart and pointed toes 30 although three or more toes are functionally equivalent, and a second arm 40 rotatably joined with the pair of first arms 10 at a medially positioned pivot means 50 which is preferably a simple rod or screw shaft held in place with nuts as shown. The arms preferably have holes for accepting the rod but these are not in the figures. The second arm 40 terminates, as with the pair of first arms 10, with the right angled foot 20 having the one or two (or more) spaced apart and pointed toes 30. A single toe 30 is desirable for each of the pair of first arms 10 while dual toes 30 are preferred for the second arm 40. However, one or more toes may be used on each foot 20 depending upon the application.

A biasing means 60, preferably a coil spring as shown, or an alternate spring type, joins a common proximal end 12 of the pair of first arms 10 with a second proximal end 42 of the second arm 40 so as to position the proximal ends in a preferred spaced apart attitude with the pointed toes 30 of the pair of first arms 10 directed toward, and spaced apart from the pointed toes 30 of the second arm 40. The biasing means 60 is enabled further for diminishing the spaced apart condition of the toes 30 for enabling the gripping of an object, such as a pot, as the second arm 40 rotates about the pivot means 50 to place the pointed toes 30 of each of the pair of first arms 10 in compressive opposition to the pointed toes 30 of the second arm 40 against opposing surfaces of the pot and this occurs due to the stretching of the spring biasing means 60. Inventively, the spaced apart toe(s) 30 terminate in a knife edge 32 and therefore function to provide a very high force on a small surface area of the unfired ware so as to securely hold the unfired ware within the grasp of the tongs. It should be understood that unfired clay objects are generally known as "greenware" which is an inclusive term describing formed, friable, penetratable clay objects in various stages of the drying or curing process, and these stages are known in the art as leatherhard, cheesehard or bone dry and possibly other terms. However, it has been discovered that a sharp edge or plural points have the ability to grip such pots securely with enough force to hold it as shown in FIG. 2. The prior art teaches the use of more encompassing supports which contact the pot over a large surface area. This is undesirable since such practice tends to smudge or otherwise distort decorative or glazing materials layers on the pots. Also undesirable are tongs which are designed to grip sidewalls or either inside/outside bottoms as these practices tend to crack or puncture greenware.

The feet 20 of the pair of divergent arms 10 provide a preferred spacing 14 therebetween which depends upon the size of the pot being made. The apparatus further provides a rigidizing strut 15 joining the pair of mutually divergent arms 10 at a position adjacent to their distal ends 17. A hook like handle 70 is provided for hanging the apparatus as it supports a pot as shown in FIG. 2. The extensive hook like handle 70 is inventively an integral extension of the proximal end 42 of the second arm 40 and is directed or curved in such a way as to extend toward the proximal end 12 of the pair of first arms 10. The hook like handle provides, by its extensiveness and shape, for enabling the selection of a wide range of angles by which the apparatus may extend downwardly from the handle when suspended thereby from a horizontal peg or cord. This is possible because, when the handle is placed on such a peg or cord at different positions along it length, the weight of the suspended pot or other object being held by the apparatus causes the tongs to shift its angle with the vertical.

A bias means adjusting means 52, such as the holes shown best in FIG. 1, is provided and is enabled for changing the bias tension of the bias means 50 by simply selecting the attachment point of the spring, i.e., hole 52' or hole 52". Such changes in the spring tension are advantageous for holding objects over a wide range of sizes with appropriate tension. Clearly, the tension must be such as to secure the pot but not enough to crush the pot which, until it receives a final firing is quite fragile.

As shown in FIG. 1, the pair of first arms and the second arm are inventively each made of a flat metal strap material which will be found to be quite economical to use and readily available. It provides a rectangular cross-section, having a long dimension L and a short dimension S. Inventively, the distal ends 17, 47 of the arms 10, 40 respectively, are twisted one-quarter of a turn about the longitudinal axis relative to the proximal ends 12, 42 of the arms so as to provide bias rigidity at the proximal ends of the arms where the arms might tend to bend due to the spring tension, and at the same time provides arm flexture due to material resilience as well as the desired toe spacing at the distal ends 17, 47 of the arms where the feet contact the pot.

The use of three feet for holding a round object provides a solution similar to the three legged stool, i.e., the ability to grasp a range of sizes intimately. The use of high surface pressure gripping provides an advantage over alternate methods. The use of twisted legs in the tongs provides a maximal advantage in the use of a common and therefore inexpensive strap material.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A tongs apparatus comprising:
   a pair of first mutually divergent arms, each of the arms distally terminating with a foot having at least two spaced apart and pointed toes;
   a second arm rotatably joined with the pair of first arms at a medially positioned pivot means, the second arm terminating, with a further one of said feet having the at least two spaced apart and pointed toes;
   the pointed toes of the pair of first arms directed toward, and spaced apart from, the pointed toes of the second arm;
   a biasing means joining a common proximal end of the pair of first arms with a proximal end of the second arm so as to position the arms in a preferred attitude, said biasing means enabled for diminishing said spaced apart condition of the toes for enabling the gripping of an object as the second arm rotates about the pivot means to place the pointed toes of each of the pair of first arms in compressive opposition to the pointed toes of the second arm;
   a biasing means adjusting means enabled for changing a bias tension of the biasing means.

2. The apparatus of claim 1 wherein the feet of the pair of divergent arms provide a preferred spacing therebetween, the apparatus further providing a rigidizing strut joining the pair of mutually divergent arms at a position adjacent the distal ends thereof.

3. The apparatus of claim 1 further providing an extensive hook-like handle for hanging the apparatus therefrom, the hook-like handle enabled by its extensiveness and shape for selecting the angle by which the apparatus extends downwardly from the handle.

4. The apparatus of claim 3 wherein the hook-like handle is an integral extension of the proximal end of the second arm and is directed toward the proximal end of the pair of first arms.

5. The apparatus of claim 1 wherein the spaced apart toes terminate, and are joined with a knife edge.

6. The apparatus of claim 1 wherein the pair of first arms and the second arm are each made of a flat metal strap material of rectangular cross-section, said cross-section providing a long dimension and a short dimension, and wherein the distal ends of the arms are twisted orthogonally relative to the proximal ends of the arms so as to provide bias rigidity at the proximal ends of the arms and to provide arm flexture and toe spacing at the distal ends of the arms.

7. A tongs apparatus comprising:
   a pair of first mutually divergent arms, each of the arms distally terminating with a foot having at least one pointed toe;
   a second arm rotatably joined with the pair of first arms at a medially positioned pivot means, the second arm terminating with a further one of said feet having at least one pointed toe;
   the pointed toes of the pair of first arms directed toward, and spaced apart from, the pointed toes of the second arm;
   a biasing means joining a common proximal end of the pair of first arms with a proximal end of the second arm so as to position the arms in a preferred attitude, said biasing means enabled for diminishing said spaced apart condition of the toes for enabling the gripping of an object as the second arm rotates about the pivot means to place the at least one pointed toe of each of the pair of first arms in compressive opposition to the at least one pointed toe of the second arm,
   a biasing means adjusting means enabled for changing a bias tension of the biasing means.

8. The apparatus of claim 7 wherein the feet of the pair of divergent arms provide a preferred spacing therebetween, the apparatus further providing a rigidizing strut joining the pair of mutually divergent arms at a position adjacent the distal ends thereof.

9. The apparatus of claim 7 further providing an extensive hook-like handle for hanging the apparatus therefrom, the hook-like handle enabled by its extensiveness and shape for selecting the angle by which the apparatus extends downwardly from the handle.

10. The apparatus of claim 9 wherein the hook-like handle is an integral extension of the proximal end of the second arm and is directed toward the proximal end of the pair of first arms.

11. The apparatus of claim 7 wherein each of the spaced apart toes terminate with a knife edge.

12. The apparatus of claim 7 wherein the pair of first arms and the second arm are each made of a flat metal strap material of rectangular cross-section, said cross-section providing a long dimension and a short dimension, and wherein the distal ends of the arms are twisted orthogonally relative to the proximal ends of the arms so as to provide bias rigidity at the proximal ends of the arms and to provide arm flexture at the distal ends of the arms.

* * * * *